May 16, 1939.  R. R. ROBERTSON  2,158,637
ROAD JOINT
Filed April 23, 1937  3 Sheets-Sheet 1

Inventor
ROBERT R. ROBERTSON

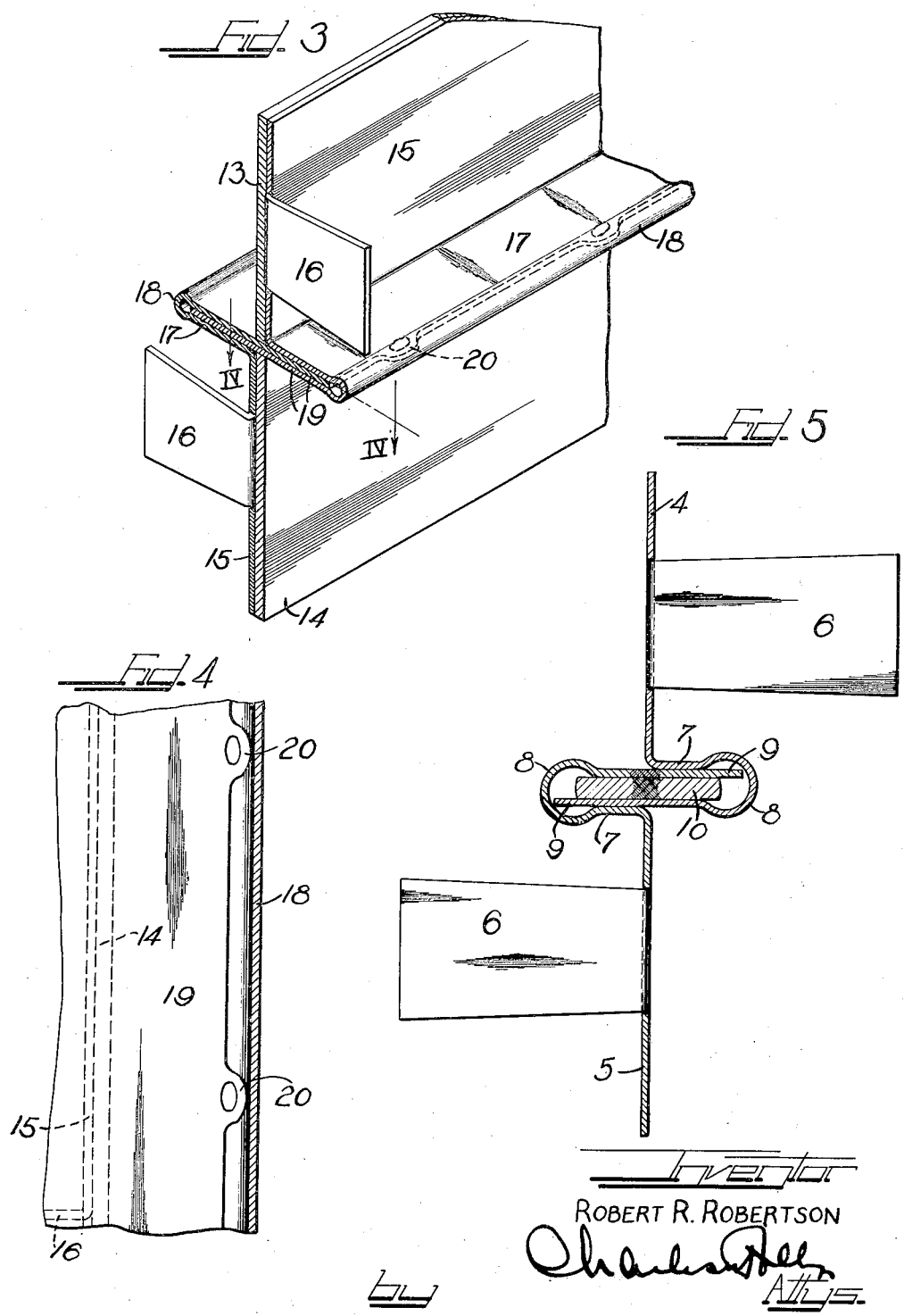

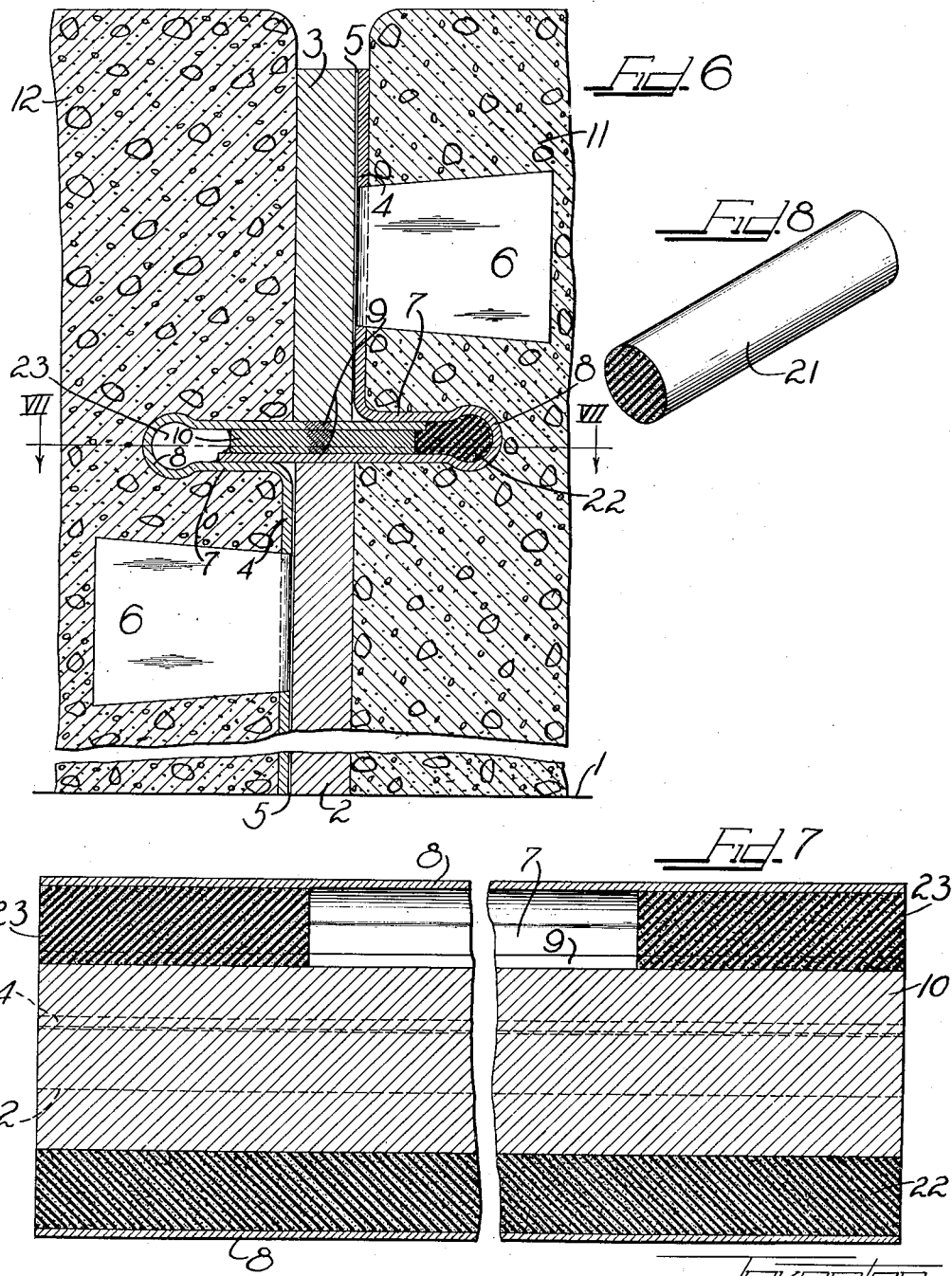

Patented May 16, 1939

2,158,637

UNITED STATES PATENT OFFICE 2,158,637

ROAD JOINT

Robert R. Robertson, Chicago, Ill., assignor to The Translode Joint Company, Chicago Heights, Ill., a corporation of Illinois Application April 23, 1937, Serial No. 138,542

13 Claims. (Cl. 94—18)

The present invention relates to improved road joints, covering both expansion and contraction joints of the cross-load transmission type, said joints including slidably interfitting joint units which are disposed on opposite sides of a filler or core and are respectively anchored in the concrete road slabs on opposite sides of the joint for the purpose of transmitting a load from one road slab across or through the joint to the opposite road slab, said load transmission units each including a plate portion which projects transversely through the filler or core, with one of said plate portions having a heavy plate or bar spot welded thereto to increase the strength of the joint where it projects transversely through the filler or core.

It is an object of this invention to provide an improved road cross-load transmission joint wherein reversed diagonally positioned load transmission units have slidably interfitting portions disposed transversely of the joint and separated by means of a substantially heavy intermediate plate or bar which is rigidly secured to one of said portions and slidable on the other.

A further object of the invention is the provision of a road load transmission joint including reversed diagonally opposite sections including plate members projecting transversely through the joint and separated by a reinforcing intermediate plate, each of said sections including an anchoring bight portion and a plate from which anchoring members project to assist the anchoring bight portion in securely anchoring each of the joint sections in a concrete road slab positioned at the side of the joint.

It is also an object of this invention to provide a road expansion joint consisting of upper and lower fillers each having cemented or otherwise secured to one side thereof a load transmission joint section each provided with anchoring blades and with a hollow anchoring bight portion enclosing a pre-compressed expansible seal and having a plate integral therewith and projecting transversely of the joint between the upper and lower fillers, said plate being separated from a corresponding plate of another joint section by means of a reinforcing bar secured to one of said plates and slidable on the other.

It is furthermore an object of this invention to provide an improved expansion joint consisting of two reversed diagonally opposite sections associated with upper and lower filler boards, said sections being separated by means of a reinforcing member secured to one of the sections and slidable with respect to the other, said reinforcing member having a sealing contact with a pre-compressed seal enclosed in one of the sections to maintain a tight seal at the intermediate portion of the joint under either expansion or contraction of the concrete road slabs between which the joint is formed.

Another object of the invention is to provide an expansion joint consisting of two interfitting joint sections having bight portions separated by a reinforcing plate, with one of said bight portions being filled with a pre-compressed sponge rubber seal having the inherent faculty of maintaining a seal between the sections with either the expansion or the contraction of road slabs between which the joint is embedded.

It is an important object of this invention to provide a road load transmission joint of either the expansion or the contraction type, comprising plates having anchoring members struck therefrom for embedding in adjacently positioned concrete road slabs, said plates having integrally formed thereon hollow anchoring sleeves adapted to be positioned opposite one another to be anchored in the oppositely positioned road slabs, said anchoring sleeves each having a plate member having slidable engagement in the anchoring sleeve of the opposite section and held in spaced relation with the plate member of said opposite section by means of a reinforcing plate secured to one of the plate members and slidable on the other of said plate members to provide a strong intermediate transverse portion in the joint.

Other and further important objects of this invention will be apparent from the disclosures in the specification and the accompanying drawings.

The invention (in preferred forms) is illustrated in the drawings and hereinafter more fully described.

On the drawings:

Figure 3 is a fragmentary and sectional isometric view of a modified form of road expansion joint embodying the principles of this invention.

Figure 4 is an enlarged fragmentary horizontal detail sectional view taken on line IV—IV of Figure 3.

Figure 5 is a vertical sectional view of a road contraction joint embodying the principles of this invention.

Figure 6 is a fragmentary vertical section through a road expansion joint embodying the principles of this invention and illustrating precompressed seals in one of the joint sections and end seal plugs in the opposite section.

Figure 7 is an enlarged transverse detail section taken on line VII—VII of Figure 6 showing the placing of the respective pre-compressed seals.

Figure 8 is an isometric view of a piece of sponge rubber round stock in normal expanded position before being compressed into the size and shape illustrated in Figure 6.

As shown on the drawings:

Figure 1:
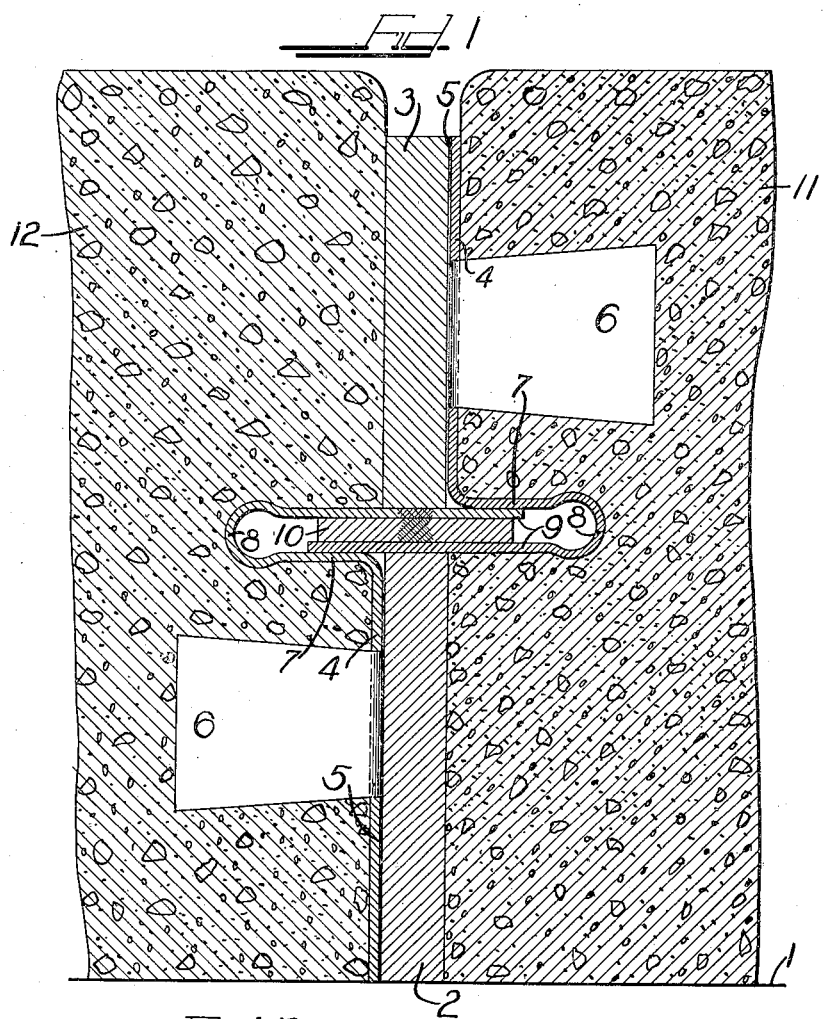
Figure 1 is a fragmentary vertical section through a road expansion joint embodying the principles of this invention and illustrating the double anchoring means for anchoring each of the joint sections in one of two adjacently positioned concrete road slabs connected by a reinforced intermediate transverse portion of the expansion joint.
Figure 2:
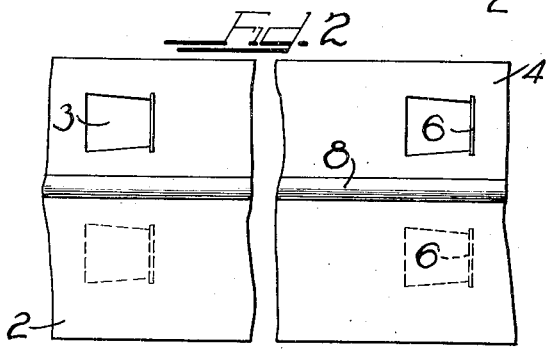
Figure 2 is a reduced fragmentary side elevational view of the expansion joint illustrated in Figure 1 with the concrete omitted.

Figures 1 and 2 illustrate a cross-load transmission joint, of the expansion type, adapted to be set up on a road sub-grade 1. The expansion joint comprises a preformed compressible bottom filler or core board 2 and an upper filler or core board 3 constructed of asphalt, sponge rubber, cork, or any other suitable compressible material, such for example, as the compressible material known to the trade as "Flexcel." The two core boards 2 and 3 are disposed one above the other and are separated and held in place by means of a load transmission device comprising a pair of reversed diagonally opposite load transmission units or sections interfitting one another transversely of the joint and separating the lower and upper core boards 2 and 3 respectively.

The two reversed diagonally positioned load transmission sections are constructed of sheet metal and are of substantially the same construction. Each of the road transmission sections comprises a main plate 4 cemented or otherwise secured at 5 to one side of one of the core members. Struck outwardly from the main plate 4 at spaced intervals are a plurality of anchoring lugs or blades 6. Integrally formed at substantially right angles to the lower margin of the main plate 4 is a connecting plate or flange 7, the outer longitudinal margin of which integrally connects up with a round split anchoring sleeve or tube 8. Positioned parallel to the connecting plate 7 and integral with the split anchoring sleeve 8 is a load transmitting plate 9 which is positioned to project across the plane of the main plate 4 and through the joint between the lower and upper core boards 2 and 3. As clearly illustrated in Figure 1, the load transmission plate 9 projects beyond the sides of the core boards and extends into the looped or bight portion of the opposite load transmission section and in frictional contact with the inner surface of the connecting plate 7 of the opposite section. The two plates 9 of the diagonally opposite load transmission sections of the joint are separated by means of a heavy metal plate or bar 10 which is spot welded or otherwise rigidly secured to the bottom surface of the plate 9 of the lower load transmission joint section. The joint reinforcing plate 10 is in frictional contact with the inner surface of the plate 9 of the upper load transmission section of the joint. The heavy metal plate separating the two joint sections is positioned transversely of the joint and reinforces the middle portion of the joint providing three substantial thicknesses of metal between the lower and upper core sections of the joint.

With the load transmission expansion joint assembled as illustrated in Figure 1, concrete is poured on opposite sides of the joint to form the road slabs 11 and 12. The anchoring blades or lugs 6 as well as the anchoring sleeves are disposed on diagonally opposite sides of the joint for anchoring in the adjacent road slabs.

The transversely disposed interfitting portion of the metal joint sections forms a suitable seal through the joint and permits a slidable interfitting operation to take place between the diagonally opposite joint sections with the expansion and the contraction of the road slabs 11 and 12 due to temperature changes or other causes. Each of the metal joint sections is anchored in its respective concrete road slab, both by the anchoring blades 6 and by the anchoring sleeve 8. A load transmitted to either one of the road slabs is transmitted across the joint to the adjacent road slab, by means of the slidably interfitting portions of the metal joint sections and by means of the reinforced or strengthened middle portion of the joint formed by the plates 9 and 10.

Figures 3 and 4 illustrate a modified form of a load transmission expansion joint comprising a precast upper filler or core board 13 and a lower filler or core board 14 constructed of "Flexcel," or any other suitable material. Cemented or otherwise secured to one side surface of each of the core boards is a metal expansion joint section or unit comprising a main plate 15, having struck outwardly therefrom at spaced intervals, a plurality of anchoring lugs or blades 16. Integrally formed on the lower margin of the main plate 15 and projecting outwardly at substantial angles thereto, is a connecting plate or flange 17, the outer margin of which is integrally connected to one side of a split anchoring sleeve or tube 18. Also integrally connected with the opposite side of the anchoring sleeve 18 is a load transmission plate 19 which projects through the vertical plane of the joint between the upper and lower core boards 13 and 14 and extends into the looped or bight portion of the opposite expansion joint unit between the plates 17 and 19 thereof. The longitudinal margin of each plate 19, at spaced intervals, is provided with cuts or slots which are enlarged to form expanded scallops or loops 20. The loops 20 of one joint unit project into the sleeve 18 of an opposite unit and serve as a means to share the compressional strains, with the core boards, when the concrete slabs on opposite sides of a joint expand.

If desired, for a particular road construction, the expansion joint illustrated in Figures 3 and 4 may have the plates 19 thereof separated, by means of a heavy metal reinforcing plate or bar 10, similar to the arrangement illustrated in Figure 1.

Figure 5 illustrates another modified form of load transmission joint of the contraction joint type. The contraction joint is of substantially the same construction as the joint illustrated in Figure 1 with the exception that the filler or core boards 2 and 3 are omitted thereby permitting the looped portions of the joint units to be pushed closer together to position the main plates 4 and 5 of the upper and lower joint units in the same vertical plane thereby positioning the outer marginal edges of the plates 9 in substantial contact with the inner surfaces of the anchoring sleeves 8.

Inasmuch as the various parts of the contraction joint illustrated in Figure 5 correspond with parts of the expansion joint illustrated in Figure 1, the corresponding parts are designated with the reference numerals used in Figure 1.

In both types of road joints, that is in both the expansion joint and the contraction joint of the type hereinbefore described, loads applied to a road slab on one side of the joint are adapted to be transmitted through the joint through the interfitting portions of the joint sections to the road slab on the opposite side the joint. In the improved joint, each joint unit or section is anchored at a plurality of points in the road slab on one side of the joint, by the anchoring blades 6, in addition to the anchoring sleeves 8, of the joint section.

Figures 6, 7, and 8 illustrate a modified form of road expansion joint of substantially the same construction as the joint illustrated in Figures 1 and 2 with the exception of the addition of sealing means. The corresponding joint parts are indicated by the reference numerals used in connection with the description of the joint illustrated in Figures 1 and 2.

In this modified form of the joint it is intended to seal the hollow bight portion of the upper and lower interfitting joint sections with tubular sponge rubber stock 21 which is of a diameter greater than the space in which the rubber seal is to be compressed. During the formation of the upper joint section, a length of the sponge rubber stock 21 extends from one end of the joint to the other and is compressed into the bight portion 8 and extends between portions of the plates 7 and 9. The sponge rubber tubing being larger than the space into which it is to be compressed assumes the shape of the opening in which it is forced and springs into resilient sealing contact with the side of the bar or plate 10 and against the margins of the plate 9 of the lower joint section to completely fill the joint opening as clearly illustrated in Figure 6 in which the rubber seal assumes a substantially keyhole cross section 22. The sponge rubber seal being pre-compressed into the bight portion of the upper joint section, serves as a seal to prevent water or other foreign materials from passing downwardly through the upper portion of the joint through the interfitting middle portion of the joint into the bight portion of the lower joint section. The bight portion of the lower joint section is left hollow with the exception of the ends which are plugged by pre-compressed end seals 23 which are constructed of the sponge rubber tubular material 21 and are compressed into a substantially keyhole shaped cross section to plug the ends of the bight portion of the lower joint section as clearly illustrated in Figure 7.

The pre-compressed rubber seals function automatically with the contraction of the concrete road slabs 11 and 12 to expand with the enlargement of the openings, so that there is always a tight seal provided in the sealed up bight portion of the upper road joint section and the plugged end portions of the bight portion of the lower joint section. It will thus be noted that an expansion joint construction is provided wherein the expansible pre-compressed seals engaged in the bight portions of the upper and lower joint sections act automatically to maintain a seal between the interfitting joint sections both during the contraction and the expansion of the road slabs produced by temperature changes or other circumstances.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A road joint former and load distributor, comprising a pair of identically constructed joint units with one of said units reversed and inverted with respect to the other and positioned to interfit with one end of the other, each of said joint units having a plate forming a part of the interfitting end thereof projecting through the plane of the joint into a portion of the other joint unit, and a reinforcing plate disposed between the plates of said interfitting joint units, and rigidly secured to one of said plates and in frictional slidable contact with the other of said plates.

2. A road joint former and load distributor, comprising a pair of joint units reversed and inverted with respect to one another and having adjacent ends pushed together and formed to interfit one another, each of said units formed with a plurality of anchoring blades and with an anchoring sleeve portion, with said sleeve portions slidably interfitting one another, and a reinforcing plate between said units separating the sleeve portions and rigidly secured to a side extension of one of the sleeve portions and in frictional slidable contact with an extension of the other sleeve portion.

3. An expansion joint for embedding in concrete and including in combination a pair of preformed core boards, load transmission devices connected to opposite sides of the core boards and projecting therebetween to separate the core boards and comprising a pair of reversed identically constructed slidably interfitting joint units, and including anchoring sleeves embedded in the concrete for anchoring the joint units in the concrete on opposite sides of the core boards for transmitting a load applied to the concrete on one side of the joint to the concrete formed on the opposite side of the joint, anchoring blades integrally formed on each of the joint units and embedded in the concrete on diagonally opposite sides of the joint, and a reinforcing member projecting transversely between the core boards and positioned between portions of the joint units.

4. A load transmission expansion joint forming mechanism comprising core members separated by load transmitting devices and by a reinforcing member enclosed between the devices and rigidly secured to one of said devices and in slidable frictional contact with the other of said devices, each of said load transmitting devices comprising a main plate having anchoring members struck therefrom, a connecting plate integral with the main plate, an anchoring sleeve integral with the connecting plate and a load transmission plate integral with the anchoring sleeve and projecting transversely between the core members and into frictional contact with the connecting plate of the opposite load transmitting device and in contact with one side of the reinforcing member enclosed between the load transmission devices.

5. In a concrete construction, a load transmission joint comprising reversed slidably interfitting units each unit including a pair of plates integrally connected by an anchoring sleeve, with a plate of one unit slidably projecting between the plates of the other unit and in frictional contact with only one of said plates, reinforcing means enclosed by the units and separating two of the plates of said units and rigidly secured to only one of said plates, and a main plate integrally connected with one of the plates of each unit and having anchoring means projecting therefrom.

6. The combination with adjacent road slabs placed side by side and having a load transmitting joint anchored in the road slabs on opposite sides of the joint and projecting through the vertical plane of separation between the road slabs, said load transmitting joint comprising a pair of slidably interfitting sections each consisting of a split anchoring bight portion connecting a pair of plates, consisting of a narrow plate and a wide plate, a main plate integral with the narrow plate, and having anchoring blades struck outwardly therefrom, said sections arranged with the wide plates of the pair of plates thereof slidably projecting between the two plates of the opposite section, said wide plate of each of said pair of plates having expanded marginal portions projecting into the split anchoring bight portion of an opposite section.

7. The combination with adjacent road slabs placed side by side and having a load transmitting joint anchored in the road slabs on opposite sides of the joint and projecting through the vertical plane of separation between the road slabs, said load transmitting joint comprising a pair of slidably interfitting sections each consisting of a split anchoring bight portion connecting a pair of plates, consisting of a narrow plate and a wide plate, a main plate integral with the narrow plate, and having anchoring blades struck outwardly therefrom, said sections arranged with the wide plates of the pair of plates thereof slidably projecting between the two plates of the opposite section, said wide plate of each of said pair of plates having expanded marginal portions projecting into the split anchoring bight portion of an opposite section, and a reinforcing plate projecting between the slabs and enclosed by the interfitting portions of the sections and rigidly secured to the wide plate of one of the sections and in slidable frictional engagement with the wide plate of the other section.

8. A road joint former and load distributor, comprising a pair of identically constructed joint units reversed and positioned diagonally opposite one another to interfit each other, a reinforcing bar plate disposed between the interfitting portions of the joint units, and inherently expansible pre-compressed seals enclosed in the interfitting portions of the joint units on opposite sides of the reinforcing bar plate.

9. A road joint former and load distributor, comprising a pair of identically constructed joint units reversed with respect to one another and positioned diagonally opposite each other, each of said joint units having a plate forming a part thereof projecting through the plane of the joint into a portion of the other joint unit, a reinforcing plate disposed between the plates of said interfitting joint units and rigidly secured to one of said plates and in frictional slidable contact with the other of said plates, and inherently expansible pre-compressed seals enclosed by the interfitting joint units and contacting opposite sides of the reinforcing plate to close the ends of the joint units and also provide a seal therebetween.

10. A road joint former and load distributor, comprising a pair of reversed diagonally opposite interfitting joint units, each of which is formed with a plurality of anchoring blades and with an anchoring sleeve portion, with said sleeve portions slidably interfitting one another, a reinforcing plate separating the sleeve portions and rigidly secured to a side extension of one of the sleeve portions and in frictional slidable contact with an extension of the other sleeve portion, an expansible pre-compressed seal completely filling the sleeve portion of one of the joint units and in contact with the reinforcing plate, and expansible pre-compressed seal plugs closing the ends of the other of said sleeve portions and also contacting the reinforcing plate.

11. An expansion joint for embedding in concrete and including in combination a pair of preformed core boards, a load transmission means connected to opposite sides of the core boards and projecting therebetween to separate the core boards and comprising a pair of reverse identically constructed slidably interfitting joint units, including anchoring sleeves embedded in the concrete for anchoring the joint units in the concrete on opposite sides of the core boards for transmitting a load applied to the concrete on one side of the joint to the concrete formed on the opposite side of the joint, anchoring blades integrally formed on each of the joint units and embedded in the concrete on diagonally opposite sides of the joint, inherently expansible pre-compressed plugs engaged in the ends of one of said anchoring sleeves, and an inherently expansible pre-compressed seal completely filling the other of said anchoring sleeves to provide a seal between the joint units.

12. A load transmission expansion joint forming mechanism comprising core members, load transmission devices contacting diagonally opposite sides of the core members and separating said core members, a reinforcing member projecting between the core members and rigidly secured to one of said devices and in slidable frictional contact with the other of said devices, an inherently expansible pre-compressed seal in one of said devices and contacting the reinforcing member, and inherently expansible pre-compressed plugs closing the ends of the other of said devices and also contacting the reinforcing member.

13. A load transmission expansion joint comprising a pair of reversed diagonally opposite interfitting sections, a reinforcing member enclosed by the interfitting portions of the sections and in contact with both of said sections, and expansible pre-compressed sealing means enclosed by the sections on opposite sides of the reinforcing member to maintain a seal between the sections with the movement of said sections with respect to one another.

ROBERT R. ROBERTSON.